United States Patent
Jung et al.

(10) Patent No.: US 11,945,040 B2
(45) Date of Patent: Apr. 2, 2024

(54) ELECTRIC RESISTANCE WELDER AND METHOD MANUFACTURING BATTERY USING THE SAME

(71) Applicant: LG CHEM, LTD., Seoul (KR)

(72) Inventors: Jaewoong Jung, Daejeon (KR); Yeo Min Yoon, Daejeon (KR); Kyungwook Cho, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 869 days.

(21) Appl. No.: 16/981,568

(22) PCT Filed: Oct. 30, 2019

(86) PCT No.: PCT/KR2019/014480
§ 371 (c)(1),
(2) Date: Sep. 16, 2020

(87) PCT Pub. No.: WO2020/111533
PCT Pub. Date: Jun. 4, 2020

(65) Prior Publication Data
US 2021/0299779 A1 Sep. 30, 2021

(30) Foreign Application Priority Data
Nov. 27, 2018 (KR) .................. 10-2018-0148841

(51) Int. Cl.
B23K 11/30 (2006.01)
B23K 11/00 (2006.01)
B23K 11/11 (2006.01)
B23K 11/36 (2006.01)
B23K 101/36 (2006.01)
(Continued)

(52) U.S. Cl.
CPC ........ *B23K 11/3018* (2013.01); *B23K 11/002* (2013.01); *B23K 11/115* (2013.01); *B23K 11/36* (2013.01); *H01M 10/0422* (2013.01); *H01M 10/0431* (2013.01); *H01M 50/10* (2021.01); *H01M 50/107* (2021.01); *H01M 50/531* (2021.01); *B23K 2101/36* (2018.08)

(58) Field of Classification Search
CPC .................. B23K 11/002; H01M 10/0422
See application file for complete search history.

(56) References Cited

U.S. PATENT DOCUMENTS

| 7,896,219 B2 | 3/2011 | Scheuerman et al. |
| 10,632,562 B2 | 4/2020 | Suzuki et al. |
| 2009/0317712 A1 | 12/2009 | Kim et al. |

FOREIGN PATENT DOCUMENTS

| CN | 203140995 U | 8/2013 |
| CN | 206653070 U | 11/2017 |

(Continued)

OTHER PUBLICATIONS

International Search Report (PCT/ISA/210) issued in PCT/KR2019/014480, dated Feb. 7, 2020.
(Continued)

*Primary Examiner* — Robert G Bachner
(74) *Attorney, Agent, or Firm* — Birch, Stewart, Kolasch & Birch, LLP (57) ABSTRACT

The present invention relates to an electric resistance welder that includes a compressor, a welding holder, and a welding rod, wherein air compressed by the compressor may be introduced into the welding rod through the welding holder and is then discharged through air outlets formed in the welding rod.

10 Claims, 8 Drawing Sheets

(51) Int. Cl.
   *H01M 10/04* (2006.01)
   *H01M 50/10* (2021.01)
   *H01M 50/107* (2021.01)
   *H01M 50/531* (2021.01)

(56) References Cited

FOREIGN PATENT DOCUMENTS

| | | |
|---|---:|---|
| JP | 61-4882 U | 1/1986 |
| JP | 62-34978 U | 3/1987 |
| JP | 8-44783 A | 2/1996 |
| JP | 2000-317648 A | 11/2000 |
| JP | 2017-6982 A | 1/2017 |
| JP | 2017-47469 A | 3/2017 |
| JP | 2018-23981 A | 2/2018 |
| KR | 10-2010-0099652 A | 9/2010 |
| KR | 10-2014-0048607 A | 4/2014 |
| KR | 10-2015-0056674 A | 5/2015 |
| KR | 10-2015-0082470 A | 7/2015 |
| KR | 10-2017-0005581 A | 1/2017 |
| KR | 10-2018-0061072 A | 6/2018 |

OTHER PUBLICATIONS

Extended European Search Report, dated Jun. 24, 2021, for European Application No. 19891239.6.

ELECTRIC RESISTANCE WELDER AND METHOD MANUFACTURING BATTERY USING THE SAME

TECHNICAL FIELD

This application claims priority to and the benefit of Korean Patent Application No. 10-2018-0148841 filed in the Korean Intellectual Property Office on Nov. 27, 2018, the entire contents of which are incorporated herein by reference.

The present invention relates to an electric resistance welder, and a battery manufacturing method using the same.

BACKGROUND ART

In recent years, the price of energy sources has increased due to depletion of fossil fuels, interest in environmental pollution has been amplified, and the demand for environmentally-friendly alternative energy sources has become an indispensable factor for future life. Accordingly, research on various power generation technologies such as nuclear power, solar energy, wind power, tidal power, and the like has been continuously conducted, and power storage devices for more efficiently using the generated energy are also drawing attention.

Moreover, as the technology development and demand for mobile devices and battery cars increase, the demand for batteries as energy sources is rapidly increasing, and accordingly, many researches on batteries capable of meeting various needs have been conducted. In particular, there is a high demand for lithium rechargeable batteries such as lithium ion batteries and lithium ion polymer batteries with merits of high energy density, discharge voltage, and output stability.

The rechargeable battery is classified according to a structure of an electrode assembly having a structure in which an anode, a negative electrode, and a separator interposed between the anode and the negative electrode are stacked. Representatively, the electrode assembly may be classified into a jelly roll (spirally-wound) type of electrode assembly having a structure in which a positive electrode and a negative electrode are spirally wound while disposing a separator therebetween, and a stack-type electrode assembly in which a plurality of positive electrodes and a plurality of negative electrodes are sequentially stacked while disposing a separator therebetween, and recently, in order to solve the problem of the jelly roll type of electrode assembly and the stack type of electrode assembly, an electrode assembly having an advanced structure in which the jelly roll type and the stack type are mixed, has been developed. In the electrode assembly, a positive electrode and a negative electrode of a predetermined unit are stacked while disposing a separator therebetween, and then the stacked unit cells are placed on a separation film and sequentially spirally wound.

Depending on the purpose of use, such electrode assemblies are received in pouch cases, cylindrical cans, and square cases to manufacture batteries.

Among these, the cylindrical battery is easy to manufacture and has a merit of high energy density per unit weight, and is used as an energy source for various devices ranging from portable computers to battery cars.

Figure 1:
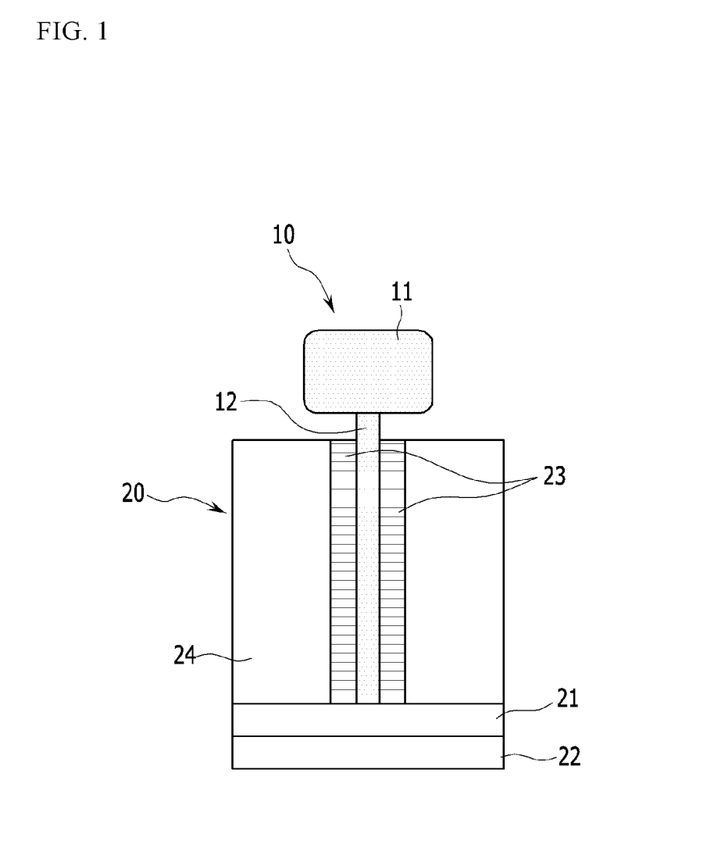
FIG. 1 is a schematic view of welding of a negative tab of a cylindrical battery to a metal can by using a conventional electric resistance welder.

FIG. 1 is a schematic view of welding of a negative tab of a cylindrical battery to a metal can by using a conventional electric resistance welder.

Referring to FIG. 1, a cylindrical battery 20 has a structure in which a jelly roll type of electrode assembly 24 is received in a metal can 22. For convenience of description, only a part of the electrode assembly 24 and a part of the metal can 22 are illustrated. An electric resistance welder 10 has a structure in which a welding rod 12 connected to a welding holder 11 and a current is applied to the welding rod 12 through the welding holder 11.

To weld a negative electrode tab 21 of the electrode assembly 24 to the metal can 22, the welding rod 12 of the electric resistance welder 10 may pass between a separation membrane 23 and one end of the welding rod 12 may contact the negative electrode tab 21. In such a state, the negative electrode tab 21 is welded to the metal can 22 by applying a current to the welding rod 12. In this case, a large amount of thermal energy is generated in the welding rod 12 through which current flows, which causes a problem of deteriorating the welding strength between the negative electrode tab 21 and the metal can 22. In addition, since the welding rod 12 is located in a narrow space between the separation membranes 23, there is a problem that the separation membranes 23 are melted and attached to the welding rod 12 when welding.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention aims to solve such problems of conventional art and technical objects that have been requested from the past.

After extensive research and various experiments, inventors of the present application confirmed that thermal energy generated in a welding rod can be discharged and a separation membrane can be distanced from the welding rod by forming an air outlet in the welding rod to discharge compressed air as described later, such that the present invention was completed.

Technical Solution

In order to achieve such a purpose, an electric resistance welder according to the present invention includes a compressor, a welding holder, and a welding rod having a plurality of air outlets. Air compressed by the compressor may be introduced into the welding rod through the welding holder and is then discharged through the plurality of air outlets in the welding rod.

The welding rod may include an air flow path formed at a center portion thereof.

The air flow path may be in fluid communication with the plurality of air outlets.

The welding holder may include an air inlet and an air outlet.

A part of air introduced through the air inlet may be introduced into the air flow path.

A remaining part of air not introduced into the air flow path may be discharged through the air outlet of the welding holder.

The plurality of air outlets may be formed at different frequencies according to a length of the welding rod.

Each of the plurality of air outlets may be formed in the shape of a slit.

The welding holder may include a valve that adjusts the amount of air introduced into the air flow path of the welding rod.

A method for manufacturing a battery by using the electric resistance welder according to the present invention may include: receiving a jelly-roll type of electrode assembly in a metal can; inserting the welding rod into a center portion of the electrode assembly; pushing a separation membrane of the electrode assembly away from the welding rod by discharging compressed air to the plurality of air outlets; and welding a negative tab of the electrode assembly to the metal can by applying a current to the welding rod.

MODE FOR INVENTION

Hereinafter, various exemplary embodiments of the present invention will be described in detail with reference to the accompanying drawings so that those skilled in the art may easily practice the present invention. The present invention may be embodied in many different forms and should not be construed as limited to the exemplary embodiments set forth herein.

In addition, unless explicitly described to the contrary, the word "comprise" and variations such as "comprises" or "comprising" will be understood to imply the inclusion of stated elements but not the exclusion of any other elements.

Further, throughout the specification, the phrase "cross-sectional view" means viewing a cross-section formed by vertically cutting a target part from the side.

Figure 2:
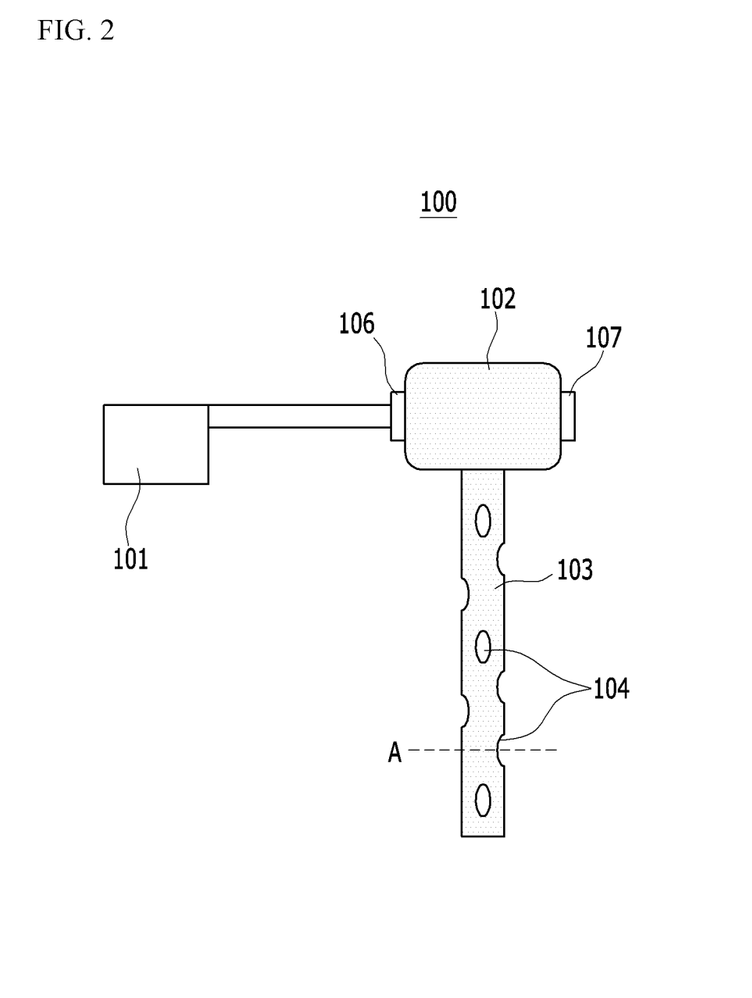
FIG. 2 is a schematic view of an electric resistance welder according to an exemplary embodiment of the present invention.
Figure 3:
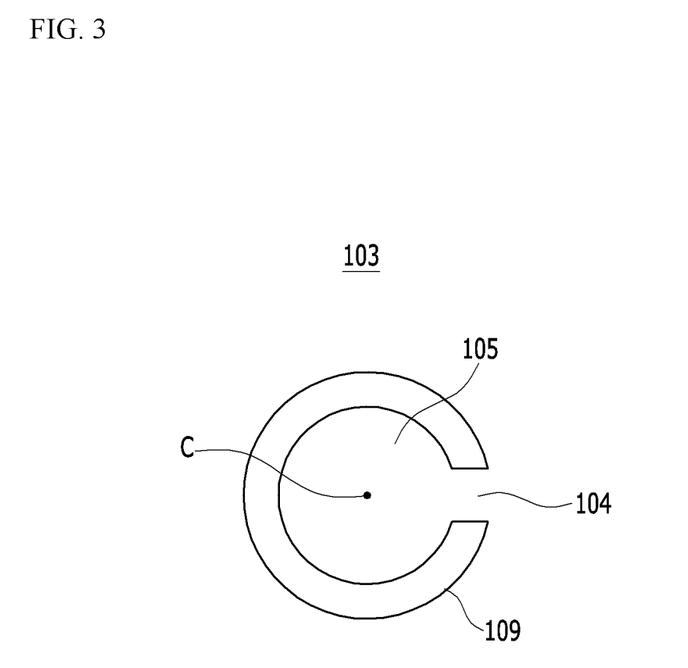
FIG. 3 is a cross-sectional view of FIG. 2, taken along the dotted line A.

FIG. 2 is a schematic view of an electric resistance welder according to an exemplary embodiment of the present invention. FIG. 3 is a cross-sectional view of FIG. 2, taken along the dotted line A.

Referring to FIG. 2 and FIG. 3, an electric resistance welder 100 may include a compressor 101, a welding holder 102, and a welding rod 103. Air compressed by the compressor 101 may be introduced into the welding rod 103 through the welding holder 102 and then emitted to the outside through air outlets 104.

The shape of the welding rod 103 is not particularly limited, but the center of the jelly roll-type electrode assembly may have a shape close to a circle, and thus may be formed in a cylindrical shape having a long length in relation to the diameter. One side of the welding rod 103 may be connected to the welding holder 102. An air flow path 105 may be formed in a center portion C of the welding rod 103, and the air flow path 105 may be in fluid communication with the welding holder 102.

A plurality of air outlets 104 may be formed on a side surface 109 of the welding rod 103, and the air outlets 104 may be in communication with the air flow path 105. A plurality of air outlets 104 may be formed along the side surface 109 in the radial direction at the center portion C of the welding rod 103.

The welding holder 102 may include an air inlet 106 and an air outlet 107. Air compressed in the compressor 101 is introduced into the welding holder 102 through the air inlet 106, and a part of the introduced air is introduced into the air flow path 105 of the welding rod 103. Other compressed air, not introduced into the air flow path 105 of the welding rod 103 may be discharged through the air outlet 107.

Through such a structure, the compressed air discharged from the air outlets 104 during welding may have a predetermined pressure, and thus a separation membrane (not shown) may be disposed apart from the welding rod 103 to prevent the separation member from being attached to the welding rod 103.

In addition, air introduced into the air flow path 105 of the welding rod 103 may cool heat energy generated in the welding rod 103 during welding while being discharged through the air outlets 104.

Figure 4:
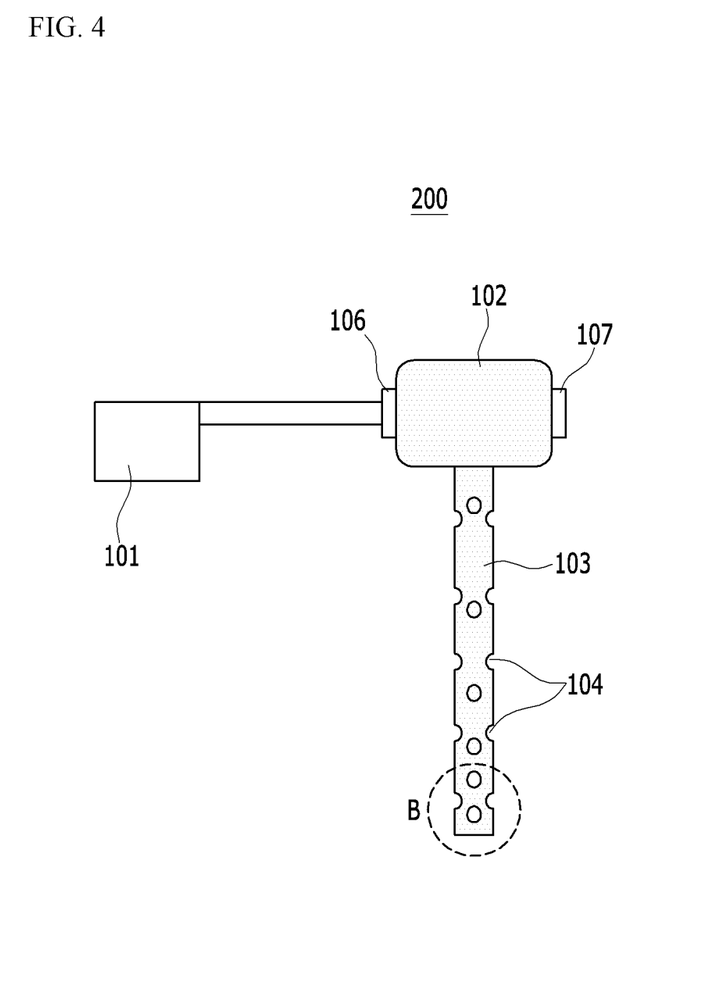
FIG. 4 to FIG. 6 are schematic views of electric resistance welders according to other exemplary embodiment of the present invention.

FIG. 4 is a schematic view of an electric resistance welder according to another exemplary embodiment of the present invention.

Referring to FIG. 4, air outlets 104 may be formed in the welding rod 103 of an electric resistance welder 200 at different frequencies depending on a distance from a welding holder 102. Except that the air outlets 104 are formed at different frequencies, the electric resistance welder 200 of FIG. 4 may include the same configurations as the electric resistance welder 100 of FIG. 2.

As previously described, the welding rod 103 may have a shape having a long length compared to the diameter thereof. In this case, when the air outlets 104 are formed at the same frequency according to the length of the welding rod 103, the amount of air discharged from the air outlets 104 disposed close to the welding holder 102 and the amount of air discharged from the air outlets 104 disposed far from the welding holder 102 may be different from each other. Therefore, the amount of discharged air is reduced in the portion B where the welding rod 103 contacts an electrode tab (not shown), and thus it may not easy to separate a separation member (not shown) from the welding rod 103 and cool the welding rod 103. Thus, the air outlets 104 are formed at different frequencies depending on a distance from the welding holder 102 to the welding rod 103 of the electric resistance welder 200 so that a sufficient amount of air can be discharged even in the B portion, thereby providing the above-stated problems. In the welding rod 103 of FIG. 4, more air outlets 104 are formed in the portion B than in the vicinity of the welding holder 102.

Figure 5:
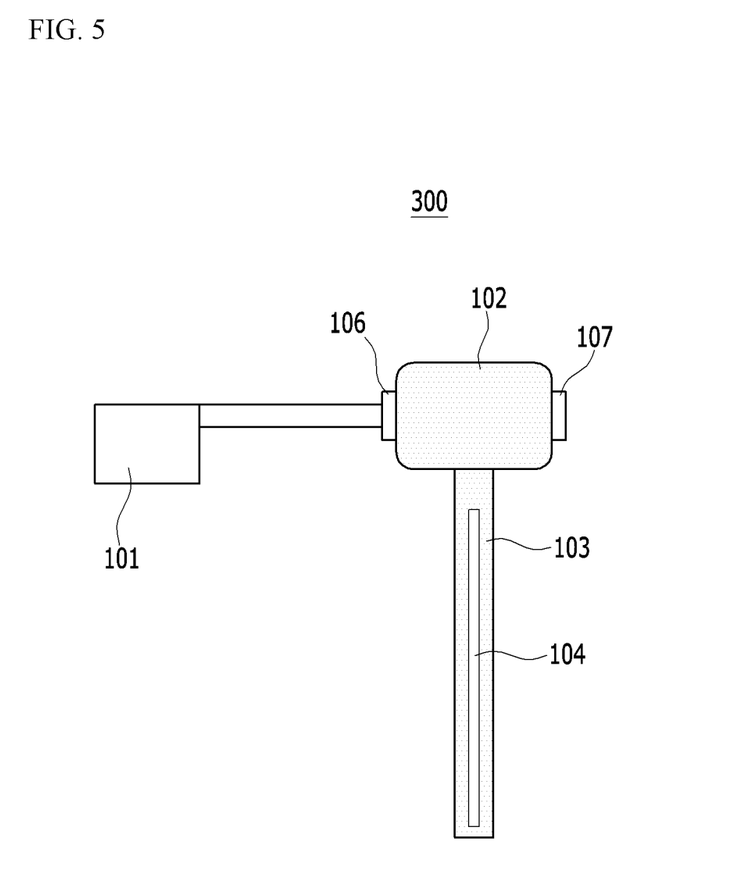

FIG. 5 is a schematic view of an electric resistance welder according to another exemplary embodiment of the present invention.

Referring to FIG. 5, an air outlet 104 formed in a welding rod 103 of an electric resistance welder 300 may be formed in various shapes. For example, the air outlet 104 may be formed in the shape of a slit. The slit-shaped air outlet 104 may be formed in the longitudinal direction of the welding rod 103. Through such a structure, the amount of air discharged through the air outlet 104 at each position along the length of the welding rod 103 can be kept constant.

Except that the air outlet 104 is formed in a slit shape, the electric resistance welder 300 of FIG. 5 may include the same configurations as the electric resistance welder 100 of FIG. 2.

Figure 6:
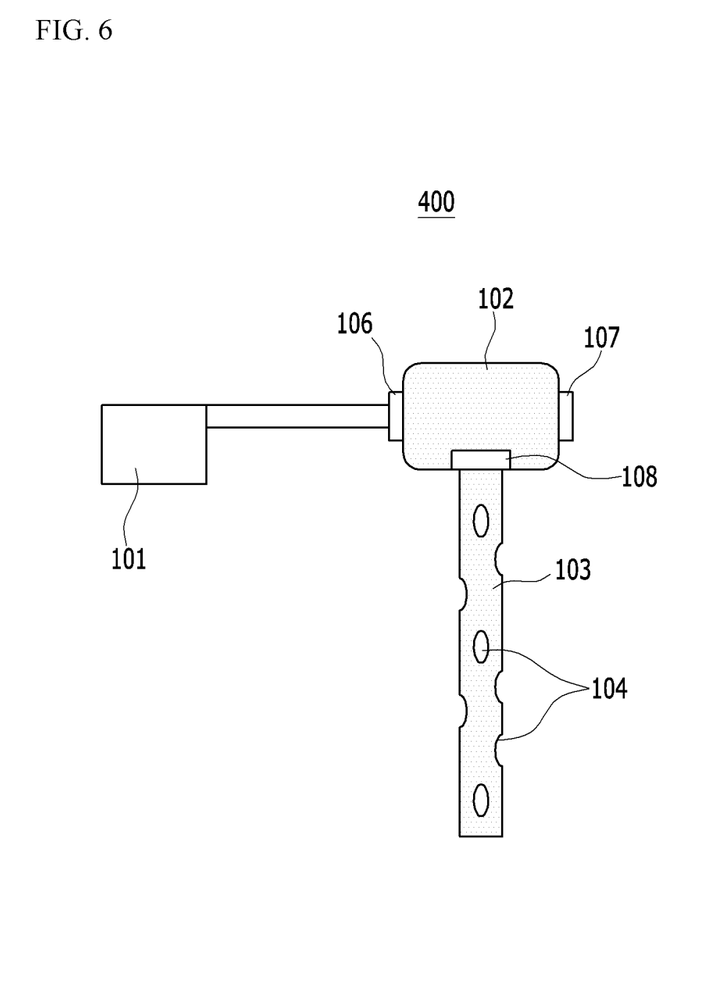

FIG. 6 is a schematic view of an electric resistance welder according to another exemplary embodiment of the present invention.

Referring to FIG. 6, in an electric resistance welder 400, a valve 108 may be included in a welding holder 102 to adjust the amount of air flowing into an air flow path 105 of a welding rod 103. Except that the valve 108 is formed on the welding holder 102, the electric resistance welder 400 shown in FIG. 6 may include the same configurations as the electric resistance welder 100 of FIG. 2.

As another exemplary embodiment of the present invention, the valve 108 of FIG. 6 may be applied to the exemplary embodiments of FIG. 2, FIG. 4, and FIG. 5.

Figure 7:
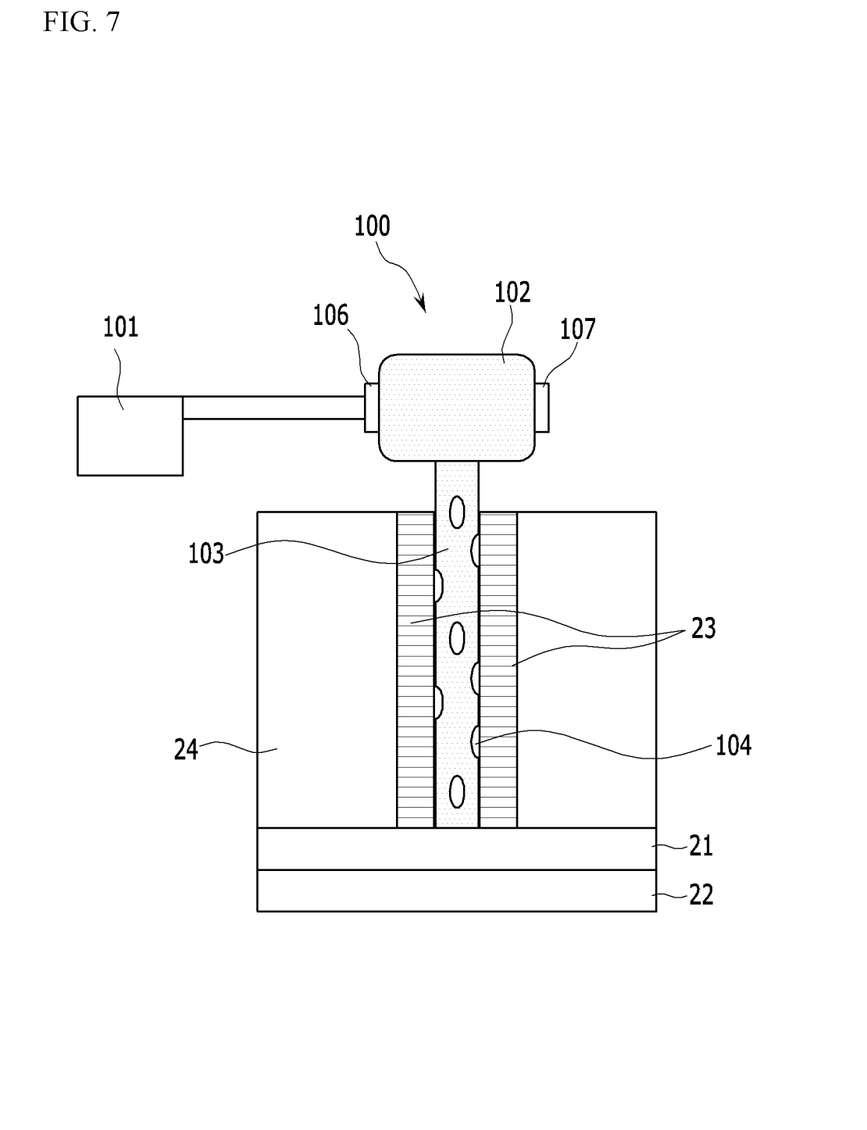
FIG. 7 and FIG. 8 are schematic views of a method (hereinafter referred to as a manufacturing method) for manufacturing a cylindrical battery using an electric resistance welder according to an exemplary embodiment of the present invention.
Figure 8:
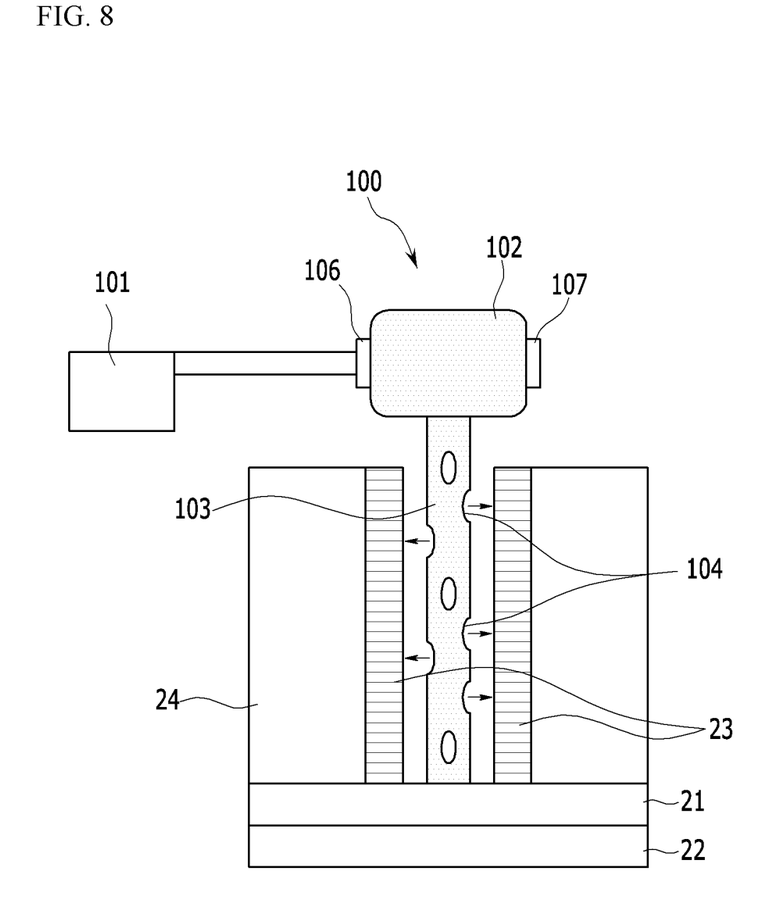

FIG. 7 and FIG. 8 are schematic views of a method (hereinafter referred to as a manufacturing method) for manufacturing a cylindrical battery using an electric resistance welder according to an exemplary embodiment of the present invention.

Referring to FIG. 2, FIG. 7, and FIG. 8, a battery manufacturing method according to the present exemplary embodiment may include positioning a welding rod 103 of an electric resistance welder 100 at a center portion of a jelly-roll type of electrode assembly 24, and making an end of the welding rod 103 contact a negative electrode tab 21.

In the present exemplary embodiment, introducing air compressed by operating a compressor 101 into an air flow path 105 of the welding rod 103 through a welding holder 102, and discharging the introduced air through air outlets 104, may be included. In FIG. 8, the air discharged through the air outlets 104 is indicated by an arrow. Air discharged through the air outlets 104 may separate a separation membrane 23 from the welding rod 103.

In the present exemplary embodiment, welding the negative electrode tab 21 and a metal can 22 by applying a current to the welding rod 103 may be included. Air discharged through the air outlets 104 during the welding may maintain the separation member 23 to be separated from the welding rod 103. In addition, air discharged through the air outlets 104 during the welding may cool the welding rod 103.

Those of ordinary skill in the field of the present invention will be able to make various applications and modifications within the scope of the present invention based on the contents.

INDUSTRIAL APPLICABILITY

As described above, in the electric resistance welder according to the exemplary embodiment of the present invention, an air outlet is formed in the welding rod to cool the thermal energy generated by the welding rod and prevent the separation membrane from contacting the welding rod during welding.

The invention claimed is:

1. An electric resistance welder comprising:
   a compressor;
   a welding holder; and
   a welding rod having a plurality of air outlets,
   wherein air compressed by the compressor is introduced into the welding rod through the welding holder and is then discharged through the plurality of air outlets in the welding rod.

2. The electric resistance welder of claim 1, wherein the welding rod comprises an air flow path formed at a center portion thereof.

3. The electric resistance welder of claim 2, wherein the air flow path is in fluid communication with the plurality of air outlets.

4. The electric resistance welder of claim 2, wherein the welding holder comprises an air inlet and an air outlet.

5. The electric resistance welder of claim 4, wherein a part of air introduced through the air inlet is introduced into the air flow path.

6. The electric resistance welder of claim 5, wherein a remaining part of air not introduced into the air flow path is discharged through the air outlet of the welding holder.

7. The electric resistance welder of claim 1, wherein the plurality of air outlets are formed at different frequencies according to a length of the welding rod.

8. The electric resistance welder of claim 1, wherein each of the plurality of air outlets is formed in the shape of a slit.

9. The electric resistance welder of claim 2, wherein the welding holder comprises a valve that adjusts the amount of air introduced into the air flow path of the welding rod.

10. A method for manufacturing a battery by using the electric resistance welder of claim 1, the method comprising:
    receiving a jelly-roll type of electrode assembly in a metal can;
    inserting the welding rod into a center portion of the electrode assembly;
    pushing a separation membrane of the electrode assembly away from the welding rod by discharging compressed air to the plurality of air outlets; and
    welding a negative tab of the electrode assembly to the metal can by applying a current to the welding rod.

* * * * *